United States Patent [19]

Perry et al.

[11] 4,238,306
[45] * Dec. 9, 1980

[54] ELECTRODIALYSIS PROCESS FOR THE SEPARATION OF NON-ESSENTIAL AMINO ACIDS FROM DERIVATIVES THEREOF

[75] Inventors: Mordechai Perry, Petach Tikvah; Ora Kedem, Rehovot, both of Israel

[73] Assignee: Research Products Rehovot Ltd., Rehovot, Israel

[ * ] Notice: The portion of the term of this patent subsequent to Dec. 9, 1997, has been disclaimed.

[21] Appl. No.: 12,214

[22] Filed: Feb. 14, 1979

[51] Int. Cl.³ .............................................. B01D 13/02
[52] U.S. Cl. .................................. 204/180 P; 204/301
[58] Field of Search ............................ 204/180 P, 301

[56] References Cited
U.S. PATENT DOCUMENTS

| | | | |
|---|---|---|---|
| 3,051,640 | 8/1962 | Traxler | 204/180 P |
| 3,330,749 | 7/1967 | Kuwata et al. | 204/180 P |
| 3,972,791 | 8/1976 | Stern | 204/180 P |

*Primary Examiner*—Arthur C. Prescott

[57] ABSTRACT

The invention provides a process for the separation, by electrodialysis, of a mixed aqueous solution containing a non-essential amino acid and a derivative of that acid in ionic form, into at least two separate product solutions of acid and derivative respectively, of which at least one solution contains highly pure product obtained at high quantitative yield, comprising providing an electrodialysis stack, continuously introducing a feed solution containing a non-essential amino acid and derivative thereof to be separated into feed cells of the stack, adjusting the flow rate and concentration of the solution and the electric current density applied to values adapted to create concentration polarization conditions adjacent to the membranes in the feed cells thereby accumulating a high local concentration of protons upon the surface of the anion exchange membranes, and a high local concentration of hydroxyl ions upon the cation exchange membranes and maintaining the pH of the bulk solution in the feed cells in a range of between 4–8, irrespective of the isoelectric point of the amino acid, in order to adjust for pH changes of the bulk solution occurring due to unequal rates of water dissociation at the cation and anion exchange membranes.

13 Claims, 1 Drawing Figure

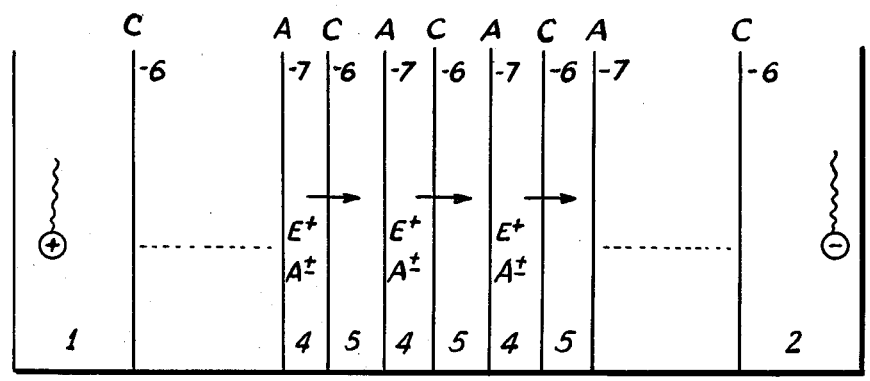

ELECTRODIALYSIS PROCESS FOR THE SEPARATION OF NON-ESSENTIAL AMINO ACIDS FROM DERIVATIVES THEREOF

The present invention relates to an improved process for the separation of non-essential amino acids from derivatives thereof. More particularly the present invention relates to a process for the separation between non-essential amino acids and their derivatives by electrodialysis, especially as a step in the resolution between optical stereoisomers of the amino acids obtained from stereospecific enzymatic hydrolysis wherein high plurity of each of the separated species and high quantitative yield are required.

As is known non-essential amino acids are those naturally occurring or synthetically prepared alpha-amino acids which are non-essential for animal or human nutrition and the term non-essential amino acids as used herein is directed to such acids. Examples of such acids include Glycine, phenylglycine, p-hydroxy-phenylglycine, α-methyldopa, Alanine, Serine, Norleucine, Glutamic acid, Proline, Oxyproline, Tyrosine, Cystine, Aspartic acid and Citrulline.

The application of electrodialysis for purifying and resolving aqueous solutions of amino acids is known in the art and various processes utilizing electrodialysis for said purpose are described in U.S. Pat. Nos. 3,051,640; 3,231,485; 3,459,650; 3,330,749; 3,398,078 and in Israel Pat. No. 16,270.

Thus, while the application of electrodialysis for purifying and resolving aqueous solutions of amino acids, is therefor in itself not new, the processes represented in said patents can be classified into 3 different groups:

1. Separation between a mixture of different amino acids obtained from protein hydrolysates.
2. Removal of inorganic salts from a solution of amino acid.
3. Purification of amino acids of inorganic and organic odorous and colored impurities.

It will be noted from said prior art patents that heretofor, in light of the fact that at the isoelectric point of an amino acid there exists the highest concentration of the amino acid in non-ionic form, attempts were made to adjust the pH to the specific isoelectric point to reduce the concentration of other ionic forms of the amino acid and thereby to reduce the losses caused by the migration of said ions through the ion exchange membranes. Thus the above-mentioned patents which describe the adjustment of pH in the feed compartment as part of the process described and/or claimed are based on the neutralization of the charge of amino acid by adjusting the pH of the bulk solution as closely as possible to the exact isoelectric pH of the acid required to be retained in the feed cell. It has been found however, that the desalination of amino acid solutions by this method causes a significant loss of the acid, up to 20% unless special pH trap compartments or other means are introduced into the design of the ED stack (Israeli Patent No. 16270).

In the prior art processes the loss of the amino acid occurs via two different mechanisms:

a. A diffusion of the zwitterionic (non charged) form of the amino acid through the membranes; and
b. An electromigration of the charged forms of the amino acid existing in equilibrium with the zwitterionic form. Since considerable concentrations of these charged forms can be found in the feed compartment even when the amino acid is kept at its isoelectric pH said charged forms are free to migrate through the membranes thereby contributing to said losses.

The removal of organic impurities can lead to relatively pure amino acid, but also, in this case to the loss of acid along with the impurities and thus this latter method is applicable only for situations in which the impurities exist only in trace concentrations.

In contradistinction to the above processes the separation of non-essential amino acids from their charged derivatives and inorganic salts according to the present invention is endowed with an important improvement: highly pure products can be separated at a high yield from a mixture containing a large excess of inorganic and organic solutes.

In the present invention the separation of non-essential amino acid from e.g. an ester derivative thereof and from inorganic electrolytes is based on the amphoteric properties of the amino acid; namely: that the charge of the amino acid can be changed from positive to negative by changing the pH of the solution below or above the isoelectric point of the acid. Operating the electrodialysis system at high current densities, close to the value of the limiting current density, i.e., the current density at which significant dissociation of water occurs upon the electrodialysis membranes resulting in local pH changes along the surfaces of said membranes, causes significant local pH changes near the membranes, due to the transport of $H^+$ and $OH^-$ through the cation and anion exchange membranes. In this manner concentration polarization conditions are created by adjusting the electric current density close to the value of limiting current density for the flow rate applied and solute concentration used and water dissociation near the membranes creates a pH barrier on the membranes which does not allow the amphoteric amino acid to pass therethrough.

These pH barriers can be utilized in order to achieve sharp separation between the amphoteric amino-acids and their charged derivatives, or other ions, by the following mechanism: near a cation exchange membrane, through which protons are removed, the pH rises, and the amio acid becomes negatively charged. It is attracted by the electric field towards the anion exchange membrane, where it becomes positively charged, and is repelled again towards the cation exchange membrane. On the other hand, charged derivatives of the amino acid are removed by the electric field. The polarization, which is usually a nuisance, thus enhances separation.

Inorganic salts which are present are removed out of the feed compartment simultaneously with the ester, whereby the ester passes through the cation exchange membrane together with the cations of the salt, while anions of the salt are transported through the anion exchange membrane, leaving the amino acid free of both the ester and the inorganic electrolytes.

Too high or too low pH in the bulk solution or near the membranes may be detrimental, causing decomposition of some unstable derivatives of the amino acids (esters). Moreover, at such extreme pH values, the pH barriers established upon the membrane surfaces, which are responsible for the retention of the amino acids, may become neutralized, thus reducing the yield of the acid recovery. It is therefor important to keep the pH of the bulk close to the neutral value, irrespective of the value of the isoelectric pH of the amino acid.

The limiting conditions, where the above mentioned dissociation of water occurs, are very well defined in the literature, and can be controlled through current density and flow hydrodynamics in an Electrodialysis stack. The pH of the bulk can be controlled within the required limits by adding continuously base or acid to the desalted compartment.

Thus, according to the present invention there is now provided a process for the separation, by electrodialysis, of a mixed aqueous solution containing a non-essential amino acid and a derivative of the acid in ionic form, into at least two separate product solutions of acid and derivative respectively, of which at least one solution contains highly pure product obtained at high quantitative yield; comprising:

(a) providing an electrodialysis stack; (preferably made of a series of thin compartments separated alternatively by cation and anion exchange membranes which are located between a single pair of electrodes)

(b) continuously introducing a feed solution containing a non-essential amino acid and derivative thereof to be separated into feed cells of said stack;

(c) adjusting the flow rate and concentration of said solution and the electric current density applied to values adapted to create concentration polarization conditions adjacent to the membranes in the feed cells, thereby accumulating a high local concentration of protons upon the surface of the anion exchange membranes, and a high local concentration of hydroxyl ions upon the cation exchange membranes; and (d) maintaining the pH of the bulk solution in the feed cells in a range of between 4-8, irrespective of the isoelectric point of said amino acid, in order to adjust for pH changes of the bulk solution occurring due to unequal rates of water dissociation at the cation and anion exchange membranes.

Preferably the pH of the bulk solution in the feed cell will be maintained within the desired range by introducing small amounts of acid or base and especially preferred is a pH range of between about 5 and 7.

The process according to the present invention is useful for the separation of amino acids from ester or acyl derivatives thereof as exemplified hereinafter and can preferably be used when the amino acids and the derivative are different stereoisomers, whereby, e.g., an L-amino acid can be separated from a D-derivative thereof and vice versa.

In order that the invention may be understood more fully reference should be had to the following illustrative description and examples read in conjunction with the accompanying FIGURE which is schematic illustration of a multi-compartment electrodialysis stack used for carrying out the process of the present invention.

Referring now to said FIGURE there is schematically illustrated a multicompartment electrodialysis stack used for the separations described in the examples hereinafter, said stack comprising an anode compartment 1 and cathode compartment 2 and a plurality of repeating alternating feed compartments 4 and permeate compartments 5 separated by cation exchange membranes 6 and anion exchange membranes 7.

While the invention will now be described in connection with certain preferred embodiments in the following examples and with reference to the FIGURE it will be understood that it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of procedures as well as of the principles and conceptual aspects of the invention.

EXAMPLE 1

The separation between D-Phenyl Glycine and L-Phenyl-Glycine Ester

The separation in the ED stack was performed by filling the feed compartments with 10 mM D-PheGly, 2 mM L-PheGly ester, and 10 mM phosphate buffer at pH 6.0. The pH was kept in the range of 5.0-7.2, by titrating the feed solution with NaOH. This value is higher than the isoelectric pH of the acid ($pH_{iso}=3.1$). The circulating linear velocity in the feed cells was kept at about 1 cm/sec. Current density of 3 mA/cm2 was applied.

The simultaneous analysis of both the ester and the acid by means of liquid chromatography indicated complete removal of the ester. The final feed solution was tested in polarimeter in order to determine the optical purity of the sample, which was found to include 100% pure D-PheGly. Less than 3% of the acid was transported together with the ester into the permeate compartment. Final concentration of the salt found in the feed compartments was 1 mM.

COMPARATIVE EXAMPLE 2

The separation described in Example 1 was repeated, this time controlling the pH of the feed solution close to the isoelectric point of PheGly, i.e. 3.1±0.1. The analysis of the permeate solution revealed that about 60% of PheGly was lost from the feed solution, although the remaining acid was 100% optically pure D-PheGly. This experiment demonstrates the uniqueness of the separation principles exemplified by the present method, as compared with the usually applied electrodialysis performed at the isoelectric pH of the amino acid.

EXAMPLE 3

The Separation of D-para-hydroxy-phenyl-glycine

The separation of a mixed solution containing 10 mM of D-para-hydroxy-phenyl-glycine and 10 mM of D-para hydroxy phenyl-glycine methyl ester × HCl, was performed in an ED stack without buffer, but with appropriate control of pH in the range of 5.0-5.5, by adding small increments of 0.5M NaOH. Current density and circulating velocity were as in example 1. 100% pure D-para-hydroxy-PheGly was obtained in the feed.

EXAMPLE 4

Continuous separation of D-Phenyl Glycine from L-Phenyl Glycine Methyl Ester

The separation of Phenyl-Glycine from a solution containing initially 0.2 M phosphate buffer at pH 6.2, 15 mM of D-phenyl-Glycine and 15 mM of L-Phenyl-Glycine Methyl Ester, was achieved applying continuous procedure at steady state conditions. A flow rate of 0.3 ml/min of the pure product per cell pair was obtained by applying a current of 300 mA through an ED stack of 30 cm2. A circulating linear velocity of 5 cm/sec was used. The pH of the solution in the diluted cell was kept in the range of 5.0±0.4, by introducing a 0.5 M solution of sodium hydroxide. The steady state concentration of the inorganic salts in this compartment was about 2 mM/L. The selective removal of the ester and the inorganic salts was achieved when the ED system was operating close to the limiting conditions, resulting in a 95% yield of β Phenyl-Glycine at an optical purity of 98%.

EXAMPLE 5

The separation and isolation of D-PheGly from a racemic mixture of DL-PheGly methyl ester in phosphate buffer, pH 6.0, was achieved in the following way: A DL-PheGly methyl ester solution (20 mM) in phosphate buffer, (100 mM, pH 6.0) was pressed through a column composed of immobilized amino acid ester hydrolase in sepharose particles. The permeate contained D-PheGly and L-PheGly methyl ester in phosphate buffer, pH 5.0. This mixture was continuously fed into the feed compartments of the ED stack and separated as described in Example 1. The product remaining in the feed compartment contained 98% pure D-PheGly.

While particular embodiments of this invention have been described it will be evident to those skilled in the art that the present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for the separation, by electrodialysis, of a mixed aqueous solution containing a non-essential amino acid and a derivative of that acid in ionic form, into at least two separate product solutions of acid and derivative respectively, of which at least one solution contains highly pure product obtained at high quantitative yield, comprising:
    (a) providing an electrodialysis stack;
    (b) continuously introducing a feed solution containing a non-essential amino acid and derivative thereof to be separated into feed cells of said stack;
    (c) adjusting the flow rate and concentration of said solution and the electric current density applied to values adapted to create concentration polarization conditions adjacent to the membranes in the feed cells thereby accumulating a high local concentration of protons upon the surface of the anion exchange membranes, and a high local concentration of hydroxyl ions upon the cation exchange membranes; and
    (d) maintaining the pH of the bulk solution in the feed cells in a range of between 4–8, irrespective of the isoelectric point of said amino acid, in order to adjust for pH changes of the bulk solution occurring due to unequal rates of water dissociation at the cation and anion exchange membreanes.

2. A process according to claim 1 wherein the pH of the bulk solution in the feed cell is adjusted by introducing small amounts of acid thereto.

3. A process according to claim 1 wherein the pH of the bulk solution in the feed cell is adjusted by introducing small amounts of base thereto.

4. A process according to claim 1 wherein the pH of the bulk solution in the feed cell is adjusted and maintained in a range of between 5 and 7.

5. A process according to claim 1 wherein said stack is made of a series of thin compartments separated alternatively by cation and anion exchange membranes which are located between a single pair of electrodes.

6. A process according to claim 1 wherein the mixture to be separated is obtained by an L- or D-specific enzymatic hydrolysis of a DL-amino acid derivative.

7. A process according to claim 1 wherein the mixture to be separated is obtained as a result of immobilized enzyme hydrolysis.

8. A process according to claim 1 for the production of optically pure non-essential amino acids by the separation of a mixed aqueous solution containing an L-amino acid and a D-derivative thereof.

9. A process according to claim 1 for the production of optically pure non-essential amino acids by the separation of a mixed aqueous solution containing a D-amino acid and an L-derivative thereof.

10. A process according to claim 1 wherein said amino acid is selected from the group consisting of Glycine Alanine, Serine, Norleucine, Glutamic acid, Proline, Oxyproline, Tyrosine, Cystine, Aspartic acid and Citrullin.

11. A process according to claim 1 wherein said amino acid is selected from the group consisting of phenylglycine, p-hydroxyphenyl-glycine and α-methyl-dopa.

12. A process according to claim 1 for the separation of amino acids from ester, or acyl deritives thereof.

13. Purified non-essential amino acid obtained by the process of claim 1, wherein the purity of the separated acid is in the range of between 80–100%, and the yield is higher than 90%.

* * * * *